United States Patent Office 3,265,562
Patented August 9, 1966

3,265,562
CONTROLLING SOIL PESTS WITH ALKOXYMETH-
YL METHYLDITHIOCARBAMATES
John C. Watts, Wilmington, Del., assignor to E. I. du
Pont de Nemours and Company, Wilmington, Del., a
corporation of Delaware
No Drawing. Filed Aug. 19, 1964, Ser. No. 390,717
9 Claims. (Cl. 167—22)

This invention relates to the use of esters of alkyl-dithiocarbamic acids as fungicides and nematocides. More specifically, it refers to a method for controlling soil fungi and nematodes by applying to soil a pesticidal amount of an alkoxymethyl methyldithiocarbamate.

It is well known that sodium, zinc and manganous ethylene bisdithiocarbamate are outstanding foliar fungicides. Commercial acceptance of these three salts is widespread and continues to increase; see Chemical Week, page 58, June 1, 1963. I have now discovered that a small group of distantly related compounds have outstanding soil fungicidal and nematocidal activity. These compounds exhibit no apparent phytotoxicity to many crop plants, fruit trees or ornamentals when applied to the soil at pesticidal dosages.

Unlike many other fungicidal or nematocidal compounds, the compounds used in my invention are not phytotoxic at the minimum effective rates for in-the-row or broadcast soil treatments. The compounds which I use in this invention are toxic to fungi and nematodes at low rates, will protect crop plants for attack by these pests for an extended period and have no residual effect which will tamper with the ecology of the surrounding area.

These soil fungicidal and nematocidal compounds used in my invention which I will generically call pesticides are structurally defined as follows:

(1) 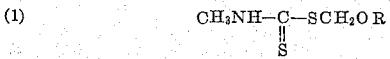

wherein R is alkyl having one through four carbon atoms, allyl, butenyl, propargyl and butynyl.

Two preferred compounds because of their outstanding activity at low rates are methoxymethyl methyldithiocarbamate and ethoxymethyl methyldithiocarbamate.

Compounds of this invention are particularly effective in controlling the damping off fungi belonging to the genus Pythium. Other soil fungi controlled include Rhizoctonia spp., Fusarium spp., Phytophthora spp., Thielaviopsis spp. and Verticillium spp. Nematodes controlled include Meloidogyne spp., Pratylenechus spp. and Tylenchorenches spp.

The alkoxymethyl methyldithiocarbamate used in this invention can be prepared as shown by the following equation:

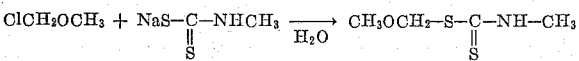

Other specific compounds used in this invention can be made similarly by simply reacting the appropriate chloromethyl ether with the sodium salt of methyldithiocarbamic acid.

The chloromethyl ethers can be synthesized from formaldehyde, HCl and the appropriate alcohol:

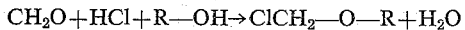

References to these reactions are recorded in Beilstein's Handbook der Organischem Chemie, vol. I, pages 580–581.

Pesticidal compositions of this invention can comprise one or more compounds of Formula 1 and one or more surface-active agents.

The surface-active agents or surfactant can include any of the anionic, cationic and non-ionic surface-active agents. Suitable surface-active agents are set out, for example, in Searle U.S. Patent 2,426,417; Todd U.S. Patent 2,655,447; Jones U.S. Patent 2,412,510; or Lenher U.S. Patent 2,130,276. A detailed list of such agents is set forth in "Detergents and Emulsifiers Annual" (1963) by John W. McCutcheon, Inc.

Among the more preferred surfactants are those anionic and non-ionic agents recognized in the art as wetting agents, dispersants or emulsifiers. Among the anionic surfactants, preferred ones are alkali metal or amine salts of alkylbenzene sulfonic acids such as dodecylbenzene sulfonic acid, fatty alcohol sulfates such as sodium lauryl sulfate, alkyl naphthalene sulfonates, both monomeric as wetting agents and polymeric as dispersants; sodium N-methyl-N-oleoyltaurate, fatty acid esters of sodium isethionate, dioctyl sodium sulfosuccinate, sodium dodecyldiphenyl oxide disulfonate and lignin sulfonates. Among the non-ionic compounds, the preferred members are alkylphenoxy poly(ethyleneoxy)ethanols such as octyl-, dodecyl-, and nonylphenol adducts with ethylene oxide; trimethylnonyl polyethylene glycol ethers, polyethylene oxide adducts to fatty and rosin acids, long chain alkyl or mercaptan adducts with ethylene oxide, ethylene oxide adducts to esters of sorbitol with fatty acids, ethylene oxide propylene oxide condensates, methyl cellulose and polyvinyl alcohol.

Most preferred anionic surfactants, because of the improved ease of dissemination for the active ingredient, are salts of alkyl naphthalene or alkyl benzene sulfonic acid. These are used together with a dispersant such as a salt of lignin sulfonic acid.

Most preferred non-ionic surfactants, because of improved ease of dissemination for the active ingredient, are ethylene oxide adducts to alkylphenol, to long chain alkyl alcohols containing eight through fourteen carbon atoms, to long chain alkyl mercaptans containing eight through fourteen carbon atoms or to sorbitan fatty acid esters.

Surfactants can be present in compositions in this invention in the range of 0.1 to 20% by weight. However, a range of 0.2 to 10% by weight is preferred.

Lower members of the series of compounds used in this invention such as methoxymethyl methyldithiocarbamate are oils of sufficiently low viscosity to permit preparation of emulsifiable concentrates by the addition of an emulsifier type surfactant directly to the active material with no extraneous solvent present.

Additional compositions can be formulated by adding a free-flowing inert powder directly to the active agent.

Free-flowing inert powders can be any of the extenders commonly employed in the fungicide and nematocide art. They can include inert finely divided diluents such as natural clays including attapulgite or kaolinite, diatomaceous earth, pyrophyllite, talc, synthetic mineral fillers derived from silica and silicates such as synthetic fine silica and synthetic calcium or magnesium silicate, carbonates, phosphates, and sulfates, sulfur, lime and flours such as wood, walnut shell, redwood, soybeans and cottonseed.

Dust compositions contain 1 to 30% by weight of the active ingredient. However, 3 to 15% by weight is preferred.

Particle size of the extender can vary considerably but will ordinarily be somewhat under 50 microns in the finished formulation. Urea and other fertilizers can be added to dust formulations to bring the concentration of active ingredients present down to 0.5 to 5% by weight of the total formulation.

In other solid compositions the active compound can be combined with the powder to form granules having a particle size of 8 to 60 mesh. Since the active compounds used in this invention are oils at room temperature, or slightly above, granules employing these compounds can be prepared by spraying the active compound or a solution of the active compound over the surface of preformed clay granules or other granular materials such as Perlite, granulated corn cobs or expanded vermiculite. Alternatively, the alkoxymethyl methyldithiocarbamates or solutions thereof can be mixed with finely divided clays and the mixture then granulated. Preferred granules will contain 0.1 to 10% by weight of an ethylene oxide adduct to alkyl phenols. In these compositions, the active compound will ordinarily be present at the rate of 1 to 25% by weight. However, 3 to 15% by weight is preferred.

In wettable powder compositions containing the active ingredient, one or more surfactants and an adsorbent solid diluent, the active compound ordinarily will be present in a concentration in the range of 15 to 50% by weight. It is preferred to have 15 to 30% by weight of active compound.

Surfactants will be present in a wettable powder composition in a range from 0.1 to 10% by weight to obtain adequate wetting and dispersion in water. Preferred surfactants used in this type of formulation are salts of alkylbenzene or alkyl naphthalene sulfonic acids. The remainder of the composition contains a solid adsorbent diluent as described above. Preferred diluents are kaolinite, attapulgite, diatomaceous earth, or synthetic fine silica.

Wettable powders are prepared by mixing the ingredients in a blender and grinding the mixture in a hammer mill, air impact mill or the like to completely extend the active component and deagglomerate the diluent to make spray application practical and easy. These wettable powders can also be blended with additional diluents, such as talcs, to form the above-mentioned dust mixtures for direct dry application.

Compositions of this invention can contain soil insecticides such as chlordane, DDT, dieldrin, endrin, aldrin, methoxychlor and others for simultaneous control of insects and fungi in the soil. From one-tenth to ten parts by weight of the insecticide is used for each one part by weight of a compound of Formula 1.

Wettable powder formulations containing an insecticide and a compound of Formula 1 are prepared by blending with a diluent and a surfactant and then grinding in a hammer mill or air-impact mill to obtain intimately blended finely divided particles. This type formulation can be dispersed in water and sprayed in broadcast treatments followed by rotovation into the soil or sprayed in the furrow.

Dust compositions containing an insecticide and a compound of Formula 1 can be prepared by blending with a diluent and grinding in a hammer mill. These dust compositions can be applied to the soil in conventional dusting equipment in broadcast treatments, in-the-row treatments or as a hopper-box treatment as part of a seeding operation.

Insecticides can also be combined with compounds of Formula 1 in emulsifiable compositions by dissolving the insecticide and a compound of Formula 1 in an inert solvent containing an emulsifier. These compositions are emulsified in water and applied to the soil much like the wettable powders above.

Compositions of this invention can also contain other nematocidally active compounds to provide controls of a broader spectrum of nematodes. Illustrative of the nematocides that could be included are:

1,4-dichloro-2-butene,
1,2-dichloropropane, mixture with 1,3-(and 2,3)-dichloropropene,
Bis(methylthiocarbamoyl)disulfide,
Allyl alcohol,
Chloropicrin,
1,2-dibromoethylene,
α-Bromotoluene,
Tetrahydro-3,5-dimethyl-1,3,5,2H-thiadiazine-2-thione,
1,2-dibromo-3-chloropropane,
Phosphorothioic acid, O-(2,4-dichlorophenyl)-O,O-diethyl ester,
Phosphorothioic acid, O,O-diethyl ester and ester with 2-pyrazinol,
Tetrachlorothiophene.

These additional nematocides will be present in the range of one-tenth to ten parts by weight for each one part by weight of the alkoxymethyl methyldithiocarbamate.

Compositions of this invention can contain other fungicides in order to control a broader spectrum of fungi. Illustrative of some of these fungicides are:

p-Dimethylaminobenzenediazo sodium sulfonate;
Quinone oxyaminobenzooxohydrazone;
Tetraalkyl thiuramsulfides such as tetramethyl thiuram monosulfide or disulfide and tetraethyl thiuram monosulfide or disulfide;
Metal salts of ethylene bisdithiocarbamic acid, e.g. manganese, zinc, iron and sodium salts;
Pentachloronitrobenzene;
Dodecylguanidine acetate;
N-trichloromethylthiotetrahydrophthalimide (Captan);
Phenylmercury acetate;
2,4-dichloro-6-(o-chloroanilino)-s-triazine;
N-methylmercury p-toluenesulfonanilide;
Chlorophenol mercuri hydroxides;
Nitrophenol mercuri hydroxides;
Ethyl mercury acetate;
Ethyl mercury 2,3-dihydroxypropyl mercaptide;
Methyl mercury acetate;
Methyl mercury 2,3-dihydroxypropyl mercaptide;
3,3'-ethylenebis(tetrahydro-4,6-dimethyl-2H-1,3,5-thiadiazine-2-thione);
Methyl mercury dicyandiamide;
N-ethyl mercury-p-toluenesulfonanilide;
Metal (e.g. iron, sodium and zinc), ammonium and amine salts of dialkyldithiocarbamic acids;
Tetrachloronitroanisole;
Hexachlorobenzene;
Methyl mercury nitrile;
Tetrachloroquinone; and
N-trichloromethylthiophthalimide.

These additional fungicides will be present in the range of one-tenth to ten parts by weight for each one part by weight of the alkoxymethyl methyldithiocarbamate.

In addition compositions can contain special additives such as corrosion inhibitors, pigments, antifoam agents and the like.

*Application.*—Compounds used in this invention can be sprayed, injected, dusted or otherwise applied on or into the soil. Soil applications are made at or before planting, as a side dressing to living plants, in the furrow, as a hopper-box treatment with seed, or as a soil drench. The dosage is from one to 200 pounds of active ingredient per acre actually treated depending on method of application and soil type.

In-the-row treatment is directed on a band approximately two to four inches wide in such a way as to strike the sides of the furrow as well as the bottom of the furrow. Seed can then be planted and the furrow closed. The seeds, seedlings and growing plants are protected during the most vulnerable period from attack by soil fungi. Alternatively, compounds of this invention can be injected in the vicinity of the closed furrow containing the seed. One-quarter to ten pounds of active ingredient per 12,000 feet of a two-inch row gives satisfactory control of fungi.

A preferred dosage in the row, because of the exceptionally good control of fungi, is one-half to three pounds of active ingredient per 12,000 feet of a two-inch wide row. Obviously, if the band width treated is more or less than two inches the dosage rate is adjusted accordingly. In-the-row treatment is extremely useful in protecting seeds, newly-germinated seedlings and young growing plants of corn, tomatoes, watermelon, squash, carrots, lettuce, cantaloupe, peppers, cucumbers, beans, cotton, tobacco, ornamentals and the like from attack by fungi.

Effective control of crop damage caused by nematodes requires the treatment of broad bands, i.e., a greater proportion of the field surface than indicated above such as in a broadcast application. The compounds used in this invention can be applied to the surface of the soil as a spray or dust and then promptly incorporated to depths of two to ten inches. Such treatments are applied as bands four inches or more wide for broadcast. Seed or other plant propagation materials are immediately placed in the treated soil or after a waiting period dictated by circumstances such as soil type, treating rate and type of crop. Nematodes are controlled with a dose of 1 to 200 pounds of active ingredient per acre of surface actually treated. A preferred rate is three to fifty pounds of active ingredient per acre.

Soil drench treatments protect seeds, seedlings and plants from the ravages of soil fungi and nematodes by application of the compounds used in this invention at rates of about 1 to 200 pounds of active ingredient per acre.

Compounds used in this invention can also be used as seed treatments. For example, the material can be applied as a slurry to the surface of seeds or can be mixed with seeds such as cotton seeds in the hopper-box treatment at planting time at rates of one to fifty ounces of active ingredient per cwt. of seeds to give control of soil fungi. A preferred rate because of excellent control and low cost is two to twenty-five ounces of active ingredient per cwt. of seeds. When cotton seeds are treated with compounds within the scope of this invention in the above-described manner, effective protection of the seeds, seedlings and growing plants is obtained against soil fungi.

In order that this invention can be better understood, the following additional examples are provided. It should be understood that all percentages given are by weight unless otherwise specified.

*Example 1*

A quantity of 80.5 parts by weight of chloromethyl methyl ether is added dropwise to 420 parts by weight of 33% aqueous solution of sodium methyldithiocarbamate, whereupon an oil separates. The slightly exothermic reaction is complete after the reaction is stirred for four hours. The oil is extracted with chloroform. After the chloroform solution is stripped, the product is dried by heating at 50° C. under 0.7 mm. pressure to give essentially pure methoxymethyl methyldithiocarbamate.

The following formulation is prepared by spraying the active ingredient onto the inert ingredients while blending in a ribbon blender until a homogeneous mixture is obtained. This mixture is then micropulverized to obtain a wettable powder in which substantially all the particles have a particle size less than 50 microns.

|  | Percent |
|---|---|
| Methoxymethyl methyldithiocarbamate | 25.0 |
| Pyrophyllite clay | 72.0 |
| Methyl cellulose, low viscosity | 0.5 |
| Alkyl naphthalene sulfonic acid, sodium salt | 1.5 |
| Anhydrous disodium phosphate | 1.0 |

This wettable powder is mixed with water and injected into soil infested with the black shank fungus *Phytophthora parasitica* var. *nicotinae*. The rate used is thirty pounds per acre of active ingredient. Tobacco seedlings planted in the treated soil are protected from attack by this fungus, resulting in a healthy stand of tobacco. Tobacco plants planted in untreated soil grow poorly or die prior to maturity resulting in less yield than from tobacco grown in treated soil.

*Examples 2–14*

The following products are made in the manner described in Example 1 by substituting the indicated quantity of ether for the chloromethyl methyl ether of Example 1. The product is substituted for the methoxymethyl methyldithiocarbamate in the formulation of Example 1 in like amount by weight. They are each formulated and applied in like manner to provide like results.

| Ex. | Ether | Quantity [1] | Product |
|---|---|---|---|
| 2 | Chloromethyl ethyl | 94.5 | Ethoxymethyl methyldithiocarbamate. |
| 3 | Chloromethyl n-propyl | 108.5 | n-Propoxymethyl methyldithiocarbamate. |
| 4 | Chloromethyl isopropyl | 108.5 | Isopropoxymethyl methyldithiocarbamate. |
| 5 | Chloromethyl n-butyl | 122.5 | n-Butoxymethyl methyldithiocarbamate. |
| 6 | Chloromethyl isobutyl | 122.5 | Isobutoxymethyl methyldithiocarbamate. |
| 7 | Chloromethyl sec-butyl | 122.5 | sec-Butoxymethyl methyldithiocarbamate. |
| 8 | Chloromethyl tert-butyl | 122.5 | tert-Butoxymethyl methyldithiocarbamate. |
| 9 | Chloromethyl allyl | 106.5 | Allyloxymethyl methyldithiocarbamate. |
| 10 | Chloromethyl 2-butenyl | 120.5 | (2-butenyl)oxymethyl methyldithiocarbamate. |
| 11 | Chloromethyl 3-butenyl | 120.5 | (3-butenyl)oxymethyl methyldithiocarbamate. |
| 12 | Chloromethyl propargyl | 104.5 | Propargyloxymethyl methyldithiocarbamate. |
| 13 | Chloromethyl 2-butynyl | 118.5 | (2-butynyl)oxymethyl methyldithiocarbamate. |
| 14 | Chloromethyl 3-butynyl | 118.5 | (3-butynyl)oxymethyl methyldithiocarbamate. |

[1] Quantity—Parts by weight required to react with 420 parts by weight of 33% aqueous sodium methyl dithiocarbamate.

*Example 15*

|  | Percent |
|---|---|
| Methoxymethyl methyldithiocarbamate | 60.0 |
| Synthetic fine silica | 37.5 |
| Sodium dioctyl sulfosuccinate | 0.5 |
| Sodium lignosulfonate | 2.0 |

The above ingredients are blended and ground in a hammer mill to obtain a homogeneous mixture in which substantially all of the particles are 50 microns or less.

This wettable powder is mixed with water and is injected into soil infested with the black root rot fungus *Thielaviopsis basicola*. The rate used is thirty pounds per acre of active ingredient. Tobacco seedlings planted in the treated soil are protected from attack by the fungus, resulting in a healthy crop of tobacco. Tobacco plants planted in untreated soil grow poorly resulting in less yield than from tobacco grown in treated soil.

*Example 16*

|  | Percent |
|---|---|
| Methoxymethyl methyldithiocarbamate | 25 |
| Alkylated naphthalene | 70 |
| Mixed polyoxyethylene ethers and oil soluble sulfonates | 5 |

The active ingredients and the emulsifier are added to the alkylated naphthalene in an agitated vessel which is provided with a steam jacket to make gentle heating possible. Heat and agitation are supplied until a homogeneous mixture is obtained which can be emulsified readily in water for spray or dip application.

*Example 17*

The following product is prepared by blending the ingredients as listed below and then passing the mixture through a deagglomerator such as an Entoleter mill to obtain a finely divided dust in which the soil fungicides and soil insecticides are uniformly distributed throughout.

| | Percent |
|---|---|
| Wettable powder of Example 15 | 16.8 |
| Dieldrin 50% W.P. | 6.0 |
| Micaceous talc | 77.2 |

This mixture which contains 10% methoxymethyl methyldithiocarbamate and 3% active dieldrin is useful as a hopper-box treatment for seeds such as cotton. For application ten pounds of this dust is mixed with a hundred weight of machine-delinted cotton seed for hopper-box application at planting time. After planting these protected seeds germinate and the cotton seedlings and growing plants are protected from soil fungi such as Rhizoctonia spp. and Pythium spp. resulting in a healthy stand of cotton which produces an excellent yield of cotton per acre. Seeds not treated as above frequently do not germinate and those that do result in seedlings which are later attacked by the above fungi resulting in a poor crop of cotton.

*Example 18*

| | Percent |
|---|---|
| Ethoxymethyl methyldithiocarbamate | 5 |
| Attapulgite clay | 15 |
| Kaolinite | 80 |

The active ingredient is blended with the attapulgite and ground in a hammer mill to obtain a concentrate which is then diluted into the finished dust by blending with the kaolinite followed by deagglomeration to obtain a uniform mixture.

This formulation is rotovated into soil infested with root-knot nematode (Meloidogyne spp.). The rate used is thirty pounds per acre of active ingredient. Tomato plants planted in the treated soil are protected from attack by the nematodes resulting in healthy plants and excellent yields of tomatoes. Tomato plants planted in untreated soil are severely attacked and, as a consequence, grow slowly and provide poor yields.

*Example 19*

Soil fungicide granules are prepared by blending the following mixture:

| | Parts |
|---|---|
| Isopropoxymethyl methyldithiocarbamate | 2 |
| Butyl cellusolve | 5 |

These ingredients form a homogeneous solution which is then sprayed over the surface of 93 parts of pre-formed and pre-screened clay granules containing substantially all of the granules in the fifteen to thirty mesh range. The granular product is then suitable for application in the standard granule applicators to soil prior to planting.

This formulation is rotovated into soil infested with soil fungi such as *Rhizoctonia solani* and Pythium spp. The rate used depending on soil type is from fifteen to sixty pounds per acre of active ingredient. Cucumber seeds are planted and subsequently grow and produce an acceptable crop. Cucumber seeds planted in untreated soil frequently do not germinate and those that do are generally diseased resulting in reduced yields.

The invention claimed is:

1. Method of controlling soil pests comprising applying to soil containing soil pests a pesticidal amount of a compound of the formula:

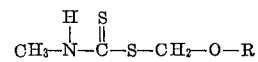

wherein R is selected from the group consisting of alkyl of 1 through 4 carbon atoms, allyl, butenyl, propargyl and butynyl.

2. Method according to claim 1 wherein the compound applied is methoxymethyl methyldithiocarbamate.
3. Method according to claim 1 wherein the compound applied is ethoxymethyl methyldithiocarbamate.
4. Method according to claim 1 wherein the compound applied is propoxymethyl methyldithiocarbamate.
5. Method according to claim 1 wherein the compound applied is butoxymethyl methyldithiocarbamate.
6. Method according to claim 1 wherein the compound applied is allyloxymethyl methyldithiocarbamate.
7. Method according to claim 1 wherein the compound applied is (2-butenyl)oxymethyl methyldithiocarbamate.
8. Method according to claim 1 wherein the compound applied is propargyloxymethyl methyldithiocarbamate.
9. Method according to claim 1 wherein the compound applied is (2-butynyl)oxymethyl methyldithiocarbamate.

No references cited.

LEWIS GOTTS, *Primary Examiner.*

SHEP K. ROSE, *Assistant Examiner.*